(12) United States Patent
Barbero

(10) Patent No.: US 11,998,924 B2
(45) Date of Patent: Jun. 4, 2024

(54) HEAVY-DUTY SHREDDER

(71) Applicant: DRAGONE S.R.L., Castagnole Delle Lanze (IT)

(72) Inventor: Simone Barbero, Castagnole Delle Lanze (IT)

(73) Assignee: DRAGONE S.R.L., Castagnole Delle Lanze (IT)

( * ) Notice: Subject to any disclaimer, the term of this patent is extended or adjusted under 35 U.S.C. 154(b) by 0 days.

(21) Appl. No.: 17/877,470

(22) Filed: Jul. 29, 2022

(65) Prior Publication Data

US 2024/0033749 A1 Feb. 1, 2024

(51) Int. Cl.
 *B02C 18/14* (2006.01)
 *B02C 18/18* (2006.01)

(52) U.S. Cl.
 CPC ............ *B02C 18/145* (2013.01); *B02C 18/18* (2013.01); *B02C 2201/066* (2013.01)

(58) Field of Classification Search
 CPC ... B02C 2201/066; B02C 18/06; B02C 18/14; B02C 18/18; B02C 18/143; B02C 18/145; B02C 18/146; B02C 18/186; A01G 3/002; B27G 13/02; B27G 13/04; B27G 13/08; B27G 13/10
 See application file for complete search history.

(56) References Cited

U.S. PATENT DOCUMENTS

| 2011/0168822 | A1 | 7/2011 | Lester et al. |
| 2017/0079219 | A1 | 3/2017 | Stanley et al. |
| 2017/0297032 | A1* | 10/2017 | Denis .................... B02C 18/184 |
| 2020/0078794 | A1* | 3/2020 | Kimbell .................. B02C 23/08 |
| 2021/0146375 | A1* | 5/2021 | Daining .................. B02C 18/06 |

FOREIGN PATENT DOCUMENTS

| DE | 112011100567 | 2/2013 |
| DE | 202016005660 | 12/2017 |
| EP | 2818248 | 12/2014 |
| EP | 3315201 | 6/2020 |
| GB | 2300131 | 10/1996 |
| IT | 201900006240 | 10/2020 |
| JP | 2015077542 | 4/2015 |
| JP | 2015077542 A * | 4/2015 |

OTHER PUBLICATIONS

English translate (JP2015077542A), retrieved date Jul. 17, 2023.*
Italian Search Report and Written Opinion issued in connection with Italian Application No. IT202100005765 and dated Nov. 25, 2021 (8 pages).

* cited by examiner

*Primary Examiner* — Matthew Katcoff
*Assistant Examiner* — Mohammed S. Alawadi
(74) *Attorney, Agent, or Firm* — Klintworth & Rozenblat IP LLP

(57) ABSTRACT

A heavy-duty shredder, in particular for use in forestry, has a frame; a rotor, which is mounted on the frame so that it can rotate about an axis of rotation and has a drum coaxial with the axis of rotation; a plurality of annular discoidal sectors extending around the drum, integral with the drum and distributed along the axis of rotation so as to form annular cavities between the adjacent annular discoidal sectors; a plurality of first teeth integral with the drum and arranged in the annular cavities between two adjacent annular discoidal sectors; and a plurality of second teeth integral with the drum and aligned with the annular discoidal sectors.

10 Claims, 2 Drawing Sheets

HEAVY-DUTY SHREDDER

CROSS-REFERENCE TO RELATED APPLICATIONS

This patent application is related to Italian patent application No. 102021000005765 filed on Mar. 11, 2021, the entire disclosure of which is incorporated herein by reference.

TECHNICAL FIELD

The present invention relates to a heavy-duty shredder, in particular for use in forestry.

STATE OF THE PRIOR ART

Heavy-duty shredders are used in forestry and more generally in the shredding of particularly resistant organic material. Forestry organic material to be shredded ranges from very small sizes, such as small branches, to very large sizes, such as trunks or trunk remains.

Heavy-duty shredders of a known type are used for shredding organic material of any size, so the final result is not particularly satisfactory when the size of the organic material varies within a very wide range.

OBJECT OF THE INVENTION

One object of the present invention is to provide a heavy-duty shredder which can mitigate the drawbacks of the prior art.

In accordance with the present invention, there is provided a heavy-duty shredder, in particular for use in forestry, the shredder comprising:
- a frame;
- a rotor pivotably mounted on the frame about an axis of rotation and comprising:
  - (i) a drum coaxial with the axis of rotation;
  - (ii) a plurality of annular discoidal sectors extending around the drum, integral with the drum and distributed along the axis of rotation so as to form annular cavities between adjacent annular discoidal sectors;
  - (iii) a plurality of first teeth integral with the drum and arranged in the annular cavities between two adjacent discoidal annular sectors; and
  - (iv) a plurality of second teeth integral with the drum and aligned with the annular sectors.

In this way, each first tooth has a working depth for material having dimensions exceeding the distance between two adjacent annular discoidal sectors equal to the portion of the first tooth which protrudes from the adjacent annular discoidal sectors. In contrast, the working depth of each first tooth is equal to the total height of the first tooth with respect to the drum for material which can be housed between two adjacent annular sectors.

In general, the working depth of each second tooth is equal to the portion of the second tooth which protrudes from the respective annular discoidal sector. For material with dimensions which can be housed in the annular channel, each tooth only works for that part of the second tooth protruding into the annular channel.

This configuration allows different-sized organic material to be shredded in an effective and quick manner, and at the same time, the inertial speed of the drum not to be reduced excessively thanks to the limitation of the working depth of the second teeth and/or the working width of the second teeth.

In particular, each first tooth is arranged in a respective annular cavity.

The bijective mapping between the first teeth and annular channels allows only one first tooth to act along each annular cavity.

In particular, each annular discoidal sector has an interruption and each second tooth is arranged in an interruption of a respective annular discoidal sector.

The bijective mapping between the second teeth and annular discoidal sectors allows only one second tooth to act along each annular discoidal sector.

In particular, the first teeth are arranged along two first helical paths mirrored with respect to the drum centreline and the second teeth are arranged along two second helical paths mirrored with respect to the drum centreline and angularly offset by about 180° with respect to the first helical paths.

The first and second helical paths and their angular offset allow the first and second teeth to be actuated in succession.

In particular, each discoidal annular sector has an outer circumferential edge; a leading edge in contact with a respective second tooth; and a trailing edge facing and spaced apart from said respective second tooth.

The circumferential edge has the function of keeping the second teeth at a given distance from the material to be shredded, while each second tooth is housed in the interruption of the respective circumferential annular sector between the leading edge and the trailing edge.

In particular, the leading edge comprises an inclined section sloping down from the outer circumferential edge towards the drum and the respective second tooth.

This configuration allows tool access to the rear of the second tooth.

In particular, the trailing edge comprises a convex profile adjacent the outer circumferential edge and a concave profile adjacent the drum.

This configuration allows the outer profile of the discoidal annular sector to be kept close to the respective tooth, and at the same time, a working space to be defined close to the drum.

In particular, each of the first and second teeth comprises a base attached to the drum and an insert, which has a cutting profile and is selectively mountable in a seat of the respective base.

In this way, when the cutting profile has worn out, the insert is easily replaced.

In particular, the shredder comprises two side supports, which are attached to the frame and are arranged at opposite ends of the rotor, the side supports having respective support surfaces arranged at a distance from the axis of rotation greater than the distance between the distal end of each of the first and second teeth and the axis of rotation.

In this way, the side supports allow the shredder to be supported when it is not in use, and the first and second teeth to be prevented from being kept at a minimum distance from the ground when it is in use.

In particular, the shredder comprises a first and a second casing, which are attached to the frame and are arranged around the rotor throughout the length of the rotor and at an angle greater than 90° around the rotor, the second casing being arranged at a distance from the rotor less than the distance between the rotor and the first casing and being selectively removable.

In this way, the size of the space where the organic material is shredded can be varied. The smaller the space, the finer the shredding.

In particular, the shredder comprises a third casing, which is arranged around the rotor throughout the length of the rotor, is hinged to the frame and actuated by an actuator.

When open, the third casing has the function of limiting the working depth of the rotor with respect to organic material arranged in front of the shredder.

BRIEF DESCRIPTION OF THE DRAWINGS

Further features and advantages of the present invention will be apparent from the following description of a non-limiting embodiment thereof, with reference to the Figures of the attached drawings, wherein.

PREFERRED EMBODIMENT OF THE INVENTION

Figure 1:
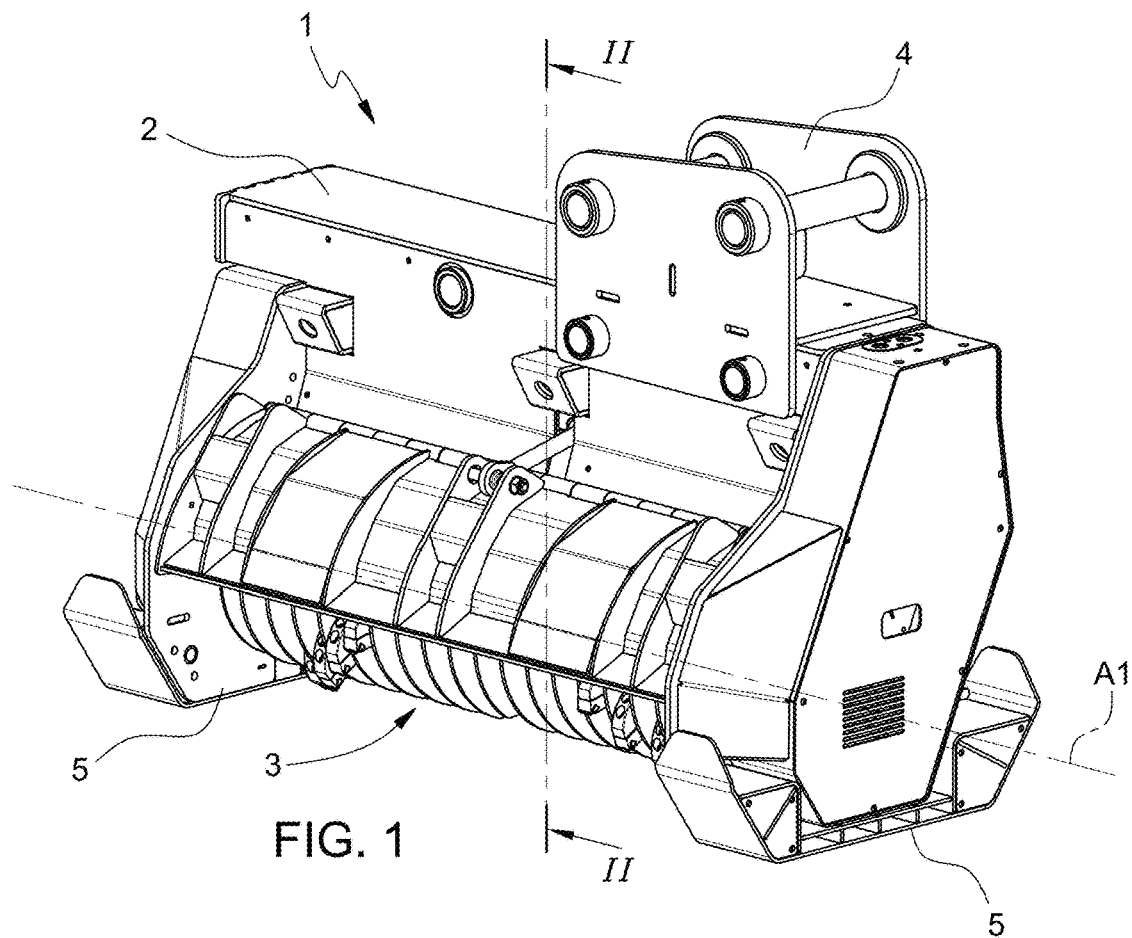
FIG. 1 is a perspective view, with parts removed for clarity, of a shredder in accordance with the present invention.

In FIG. 1, reference number 1 indicates a heavy-duty shredder, particularly for use in forestry, the shredder 1 comprising a frame 2; a rotor 3 pivotably mounted on the frame about a given axis A1; and a connection 4 for connecting the shredder 1 to a vehicle, not shown. In the case shown in FIG. 1, the connection 4 is arranged for connection to an articulated arm of the vehicle, not shown in the attached Figures.

The shredder 1 comprises two side supports 5, which are integral with the frame 2, are arranged at the opposite ends of the rotor 3, and are configured to keep the rotor 3 spaced apart from a flat surface supporting the shredder 1.

Figure 2:
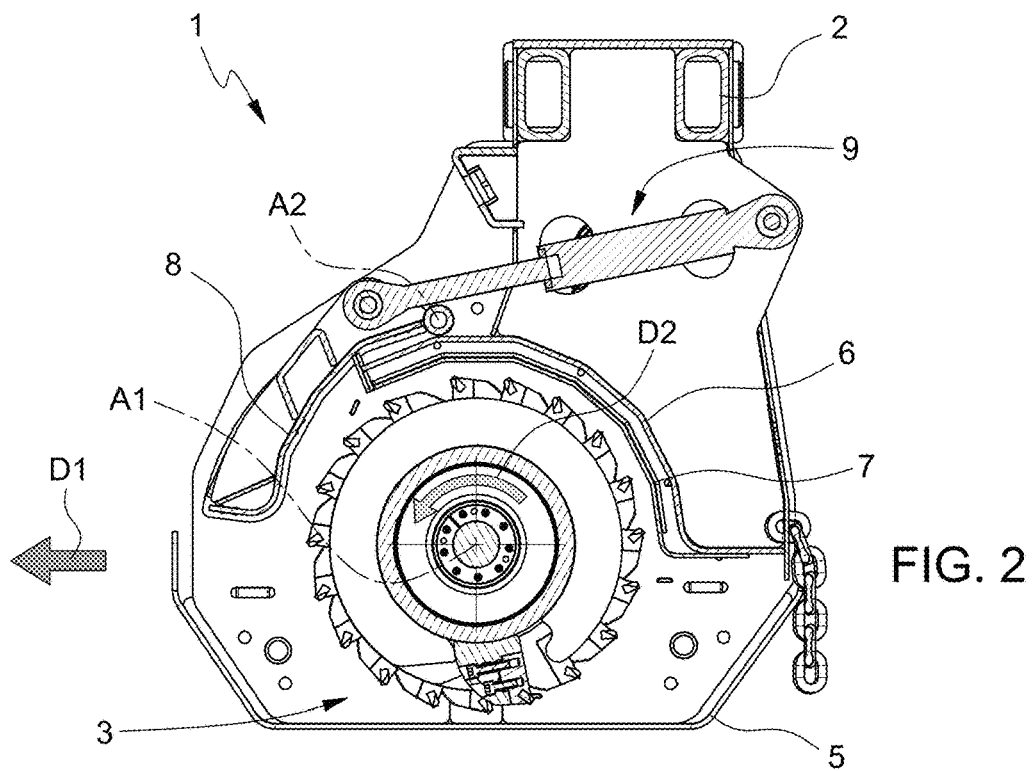
FIG. 2 is a sectional view, with parts removed for clarity, of the shredder in FIG. 1 along the section lines II-II.

With reference to FIG. 2, the shredder 1 comprises two casings 6 and 7, which are integral with the frame 2 and are arranged around the rotor 3 throughout the length of the rotor 3 and at an angle greater than 90° around the rotor 3. The casing 7 is arranged at a distance from the rotor 3, which is less than the distance between the rotor 3 and the casing 6, and is selectively removable.

The shredder 1 comprises a casing 8, which is arranged around the rotor 3 throughout the length of the rotor 3, is hinged to the frame 2 about an axis A2, and is actuated by an actuator 9 which, in the case shown herein, is a linear hydraulic actuator.

Figure 3:
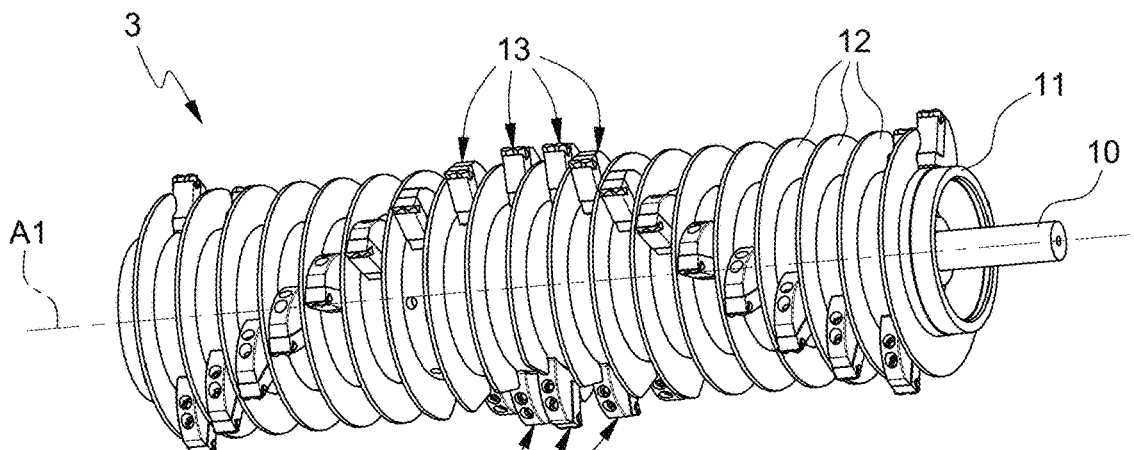
FIG. 3 is a perspective view, with parts removed for clarity, of the rotor of the shredder in FIG. 1.

With reference to FIG. 3, the rotor 3 comprises a shaft 10 that can rotate about the given axis A1; a drum 11 integral with the shaft 10 and coaxial with the given axis A1; and a plurality of annular discoidal sectors 12 extending around the drum 11, integral with the drum 11 and distributed along the given axis A1 so as to form annular cavities between the adjacent annular discoidal sectors 12.

The drum 11 comprises a plurality of teeth 13, each of which is integral with the drum 11 and is arranged in a respective cavity between two adjacent discoidal sectors 12;

and a plurality of teeth 14, each of which is integral with the drum 3 and is aligned with an annular discoidal sector 12 in a circumferential direction.

In practice, each discoidal sector 12 has an interruption so as to define a compartment communicating with two adjacent annular cavities and configured to house a respective tooth 14.

Figure 4:
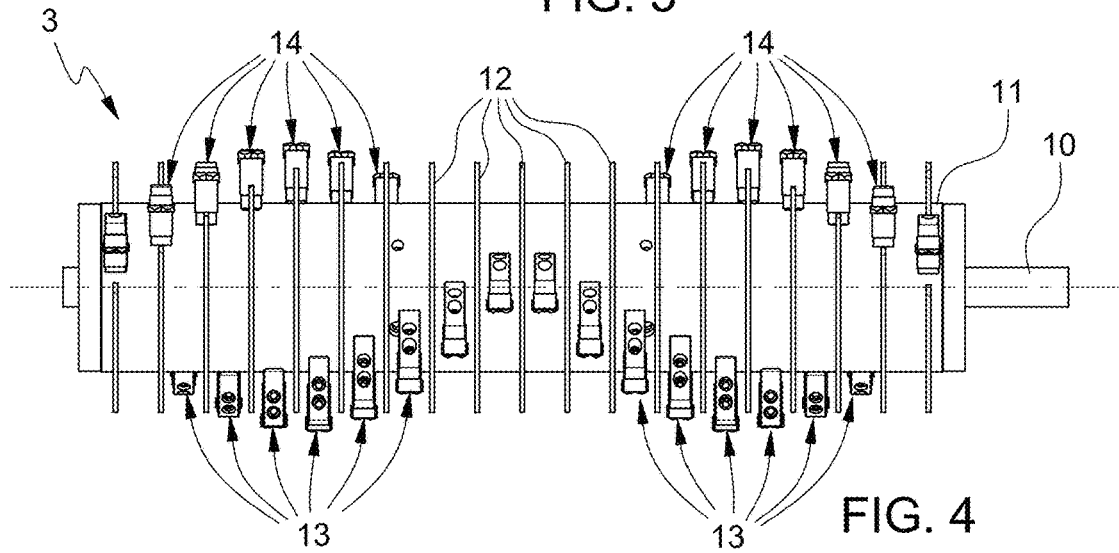
FIG. 4 is an elevation view, with parts removed for clarity, of the rotor in FIG. 3.

The teeth 13 are arranged along two first helical paths mirrored with respect to the drum 11 centreline, and the teeth 14 are arranged along two second helical paths mirrored with respect to the drum centreline and angularly offset by 180° with respect to the first helical paths, as shown in FIGS. 3 and 4. Consequently, the interruptions of the discoidal sectors 12 are arranged along the two second helical paths.

Figure 5:
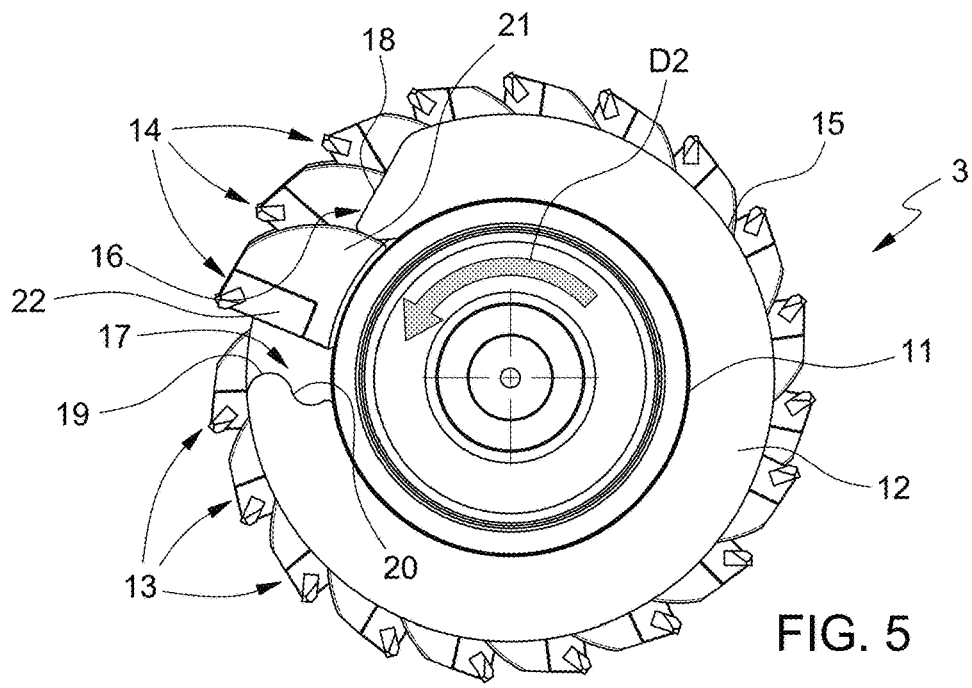
FIG. 5 is a side elevation view, with parts removed for clarity, of the rotor in FIG. 4.

With reference to FIG. 5, each annular discoidal sector 12 has an outer circumferential edge 15; a leading edge 16 close to a respective tooth 14; and a trailing edge 17 facing and spaced apart from the respective tooth 14. The terms leading edge and trailing edge refer to the direction of rotation D2 of the rotor 3.

The front edge 16 comprises an inclined section 18 sloping down from the outer circumferential edge 15 towards the drum 3 and the respective tooth 14.

The trailing edge 17 comprises a convex profile 19 adjacent the outer circumferential edge 15 and a concave profile 20 adjacent the drum 3.

Each of the teeth 13 and 14 comprises a base 21 attached to the drum and an insert 22, which has a cutting profile and is selectively mountable in a seat of a respective support 21.

With reference to FIG. 2, the shredder 1 is configured to be advanced in direction D1, with the side supports 5 resting on a surface along which the shredder 1 advances and finds material to be shredded, while the rotor 3 is rotated in direction D2.

The side supports 5 have respective support surfaces arranged at a distance from the axis of rotation A1 greater than the distance between the distal end of each of the teeth 14, 15 and the axis of rotation A1.

In use, the shredder 1 is advanced on the ground in direction D1 by the vehicle, not shown in the attached Figures, and the rotor 3 is rotated in direction D2 by a hydraulic motor, not shown in the attached Figures. The teeth 13 and 14 shred the organic material they encounter along the path through the impact with the cutting edge of the teeth 13 and 14. The cutting depth and width vary according to the size, shape and orientation of the organic material with respect to the annular discoidal sectors 12, the spacing of the annular discoidal sectors 12, and the position of the teeth 13 and 14 with respect to the annular discoidal sectors 12.

The shredder 1 is configured to operate raised with respect to the ground and with the casing 8 raised to operate on substantially vertical trunks.

Lastly, it is clear that the present invention encompasses further variants to the embodiments described herein, which fall within the scope of protection of the appended claims.

The invention claimed is:

1. A heavy-duty shredder for use in forestry, the shredder comprising:
   a frame;
   a connection for connecting the heavy-duty shredder to a vehicle;
   a rotor pivotably mounted on the frame about an axis of rotation and comprising:
      a drum coaxial to the axis of rotation;
      a plurality of annular discoidal sectors extending around the drum, integral with the drum and distributed along the axis of rotation so as to form annular cavities between adjacent annular discoidal sectors;

a plurality of first teeth comprising a base attached to the drum and an insert, wherein each of the plurality of first teach has a cutting profile and is selectively mountable in a seat of the respective base and arranged in annular cavities between two adjacent discoidal annular sectors; and a plurality of second teeth comprising a base attached to the drum and an insert, wherein each of the plurality of second teeth has a cutting profile and is selectively mountable in a seat of the respective base and aligned with the discoidal annular sectors in a circumferential direction;

wherein the first teeth are arranged along two first helical paths mirrored with respect to the drum centerline and the second teeth are arranged along two second helical paths mirrored with respect to the drum centerline and angularly offset by about 180° with respect to the first helical paths.

2. The shredder as claimed in claim 1, wherein each first tooth is arranged in a respective annular cavity.

3. The shredder as claimed in claim 1, wherein each discoidal annular sector has an interruption and each second tooth is arranged in a respective interruption of a respective discoidal annular sector.

4. The shredder as claimed in claim 1, wherein each discoidal annular sector has an outer circumferential edge; a leading edge in contact with a respective second tooth; and a trailing edge facing and spaced apart from said respective second tooth.

5. The shredder as claimed in claim 4, wherein the leading edge comprises an inclined section sloping down from the outer circumferential edge towards the drum and the respective second tooth.

6. The shredder as claimed in claim 4, wherein the trailing edge comprises a convex profile adjacent the outer circumferential edge and a concave profile adjacent the drum.

7. The shredder as claimed in claim 1, and comprising two side supports, which are attached to the frame and are arranged at opposite ends of the rotor, the side supports having respective support surfaces arranged at a distance from the axis of rotation greater than a distance between a distal end of each of the first and second teeth and the axis of rotation.

8. The shredder as claimed in claim 1, and comprising a first and a second casing, which are attached to the frame and are arranged around the rotor throughout a length of the rotor and at an angle greater than 90° around the rotor, the second casing being arranged at a distance from the rotor less than a distance between the rotor and the first casing and being selectively removable.

9. The shredder as claimed in claim 8, and comprising a third casing, which is arranged around the rotor throughout the length of the rotor, is hinged to the frame and actuated by an actuator.

10. A heavy-duty shredder for use in forestry, the shredder comprising:

a frame;

a connection for connecting the heavy-duty shredder to a vehicle;

a rotor pivotably mounted on the frame about an axis of rotation and comprising:

a drum coaxial to the axis of rotation;

a plurality of annular discoidal sectors extending around the drum, integral with the drum and distributed along the axis of rotation so as to form annular cavities between adjacent annular discoidal sectors;

a plurality of first teeth integral with the drum and arranged in annular cavities between two adjacent discoidal annular sectors; and a plurality of second teeth integral with the drum and aligned with the discoidal annular sectors, wherein the first teeth are arranged along two first helical paths mirrored with respect to the drum centerline and the second teeth are arranged along two second helical paths mirrored with respect to the drum centerline and angularly offset by about 180° with respect to the first helical paths.

\* \* \* \* \*